3,020,202
2-ACETAMIDO-4-PHENYL THIAZOLE PROCESS OF INHIBITING GASTRIC SECRETION IN HUMAN BEINGS
Patrick H. Seay, Kalamazoo, Mich., assignor to The Upjohn Company, Kalamazoo, Mich., a corporation of Delaware
No Drawing. Filed July 21, 1959, Ser. No. 828,452
1 Claim. (Cl. 167—65)

This invention relates to a therapeutic composition and to a method for utilizing the said composition in humans. More particularly, the invention relates to a gastric antisecretory composition and to a method for the administration of said composition to human beings.

The heretofore available gastric anti-secretory compositions have serious deficiencies. For example, said compositions show serious anti-cholinergic side effects such as excessive drying of the mucous membranes of the respiratory tract, blurring of vision, constipation and disturbances of urination.

The present invention provides effective gastric antisecretory action with unexpectedly lessened anti-cholinergic side effects.

The inventive composition is a pharmaceutical preparation effective in the inhibition of gastric secretion and comprising 2-acetamido-4-phenylthiazole dispersed in an oral pharmaceutical carrier. 2-acetamido-4-phenylthiazole can be prepared according to the method of Dodson and King, J.A.C.S. 67, 2242, 1945.

As used in the specification and claim of the present application, oral pharmaceutical carrier is intended to include solid oral carriers, for example, capsules, pills, pilules and tablets; and liquid oral carriers, for example, elixirs, solutions, suspensions and syrups. The solid oral and liquid oral carriers can be so formulated as to provide sustained release of the therapeutically active ingredient.

Dosage unit form as used in the specification and claim herein refers to physically discrete units suitable as unitary dosages for human subjects, each unit containing a predetermined quantity of active material calculated to produce the desired therapeutic effect in association with the required pharmaceutical diluent, carrier or vehicle. The specifications for the novel dosage unit forms of this invention are dictated by and directly dependent on (a) the unique characteristics of the active material and the particular therapeutic effect to be achieved and (b) the limitations inherent in the art of compounding such an active material for therapeutic use in humans, as disclosed in detail in this specification, these being features of the present invention. Examples of suitable dosage unit forms, as heretofore described, are tablets, capsules, pills, powder packets, wafers, cachets, teaspoonfuls, tablespoonfuls, dropperfuls, and segregated multiples of any of the foregoing, and other forms alluded to herein.

In accordance with the type of the particular carrier, that is, solid or liquid, the composition is prepared by compounding the principal therapeutically active ingredient 2-acetamido-4-phenylthiazole with any desired complementary active ingredients and supplementary ingredients.

The said complementary active ingredients comprise therapeutically active and acceptable compounds which complement the therapeutic activity of the principal active ingredient. Suitable complementary active ingredients include calcium carbonate 400 mgs., magnesium carbonate 130 mgs. and magnesium oxide 65 mgs.; aluminum hydroxide 650 mgs. and magnesium trisilicate 325 mgs.; phenobarbital 8 to 60 mgs.; methprylon 50 to 100 mgs.; ectylurea 100 to 300 mgs.; meprobamate 200 to 400 mgs.; chlorpheniramine maleate 2 to 4 mgs.; pyrilamine maleate 25 to 75 mgs.; chlorzoxazone 125 to 250 mgs.; phenaglycoldol 200 to 400 mgs.

The said supplementary ingredients are those used in compounding and formulating and are dependent upon the type of carrier. For example, in the case of a solid oral carrier, the said supplementary ingredients comprise disintegrators, lubricants, diluents, binders, flavors and the like. In the case of a liquid oral carrier, the said supplementary ingredients comprise water, edible oils, alcohol, glycol, colors, flavors, sweetening agents, suspending agents, surfactants, preservatives, and the like.

The preparations for oral use comprise from about 5 to about 200 mgs. of the principal active ingredient per dosage unit which is used four times daily to provide total daily dosages of from about 20 to about 800 mgs. of the principal active ingredient.

The compositions of the present invention are valuable therapeutic products possessing selective anti-secretory activity and unexpectedly lessened anti-cholinergic side effects.

The following examples set forth the best mode contemplated by the inventor of carrying out his invention and are not to be construed as limiting.

*Example 1.—Tablet for oral administration*

10,000 compressed tablets, each containing 100 mgs. of 2-acetamido-4-phenylthiazole, are prepared from the following types and amounts of ingredients:

| | Gms. |
|---|---|
| 2-acetamido-4-phenylthiazole | 1000 |
| Lactose | 2000 |
| Starch | 150 |

The finely powdered ingredients are mixed well and granulated with syrup-starch paste. The granulation is dried and compressed into tablets using starch and calcium stearate as lubricants. The tablets are used with satisfactory results in severe gastric hypersecretion being administered orally four times daily to human patients.

The lactose is omitted and 6500 gms. of aluminum hydroxide and 3250 gms. of magnesium trisilicate (650 and 325 mgs. per tablet, respectively) are added providing complementary antacid effects in the treatment of gastric hypersecretion.

*Example 2.—Capsule for oral administration*

10,000 capsules, each containing 10 mgs. of 2-acetamido-4-phenylthiazole, are prepared from the following types and amounts of ingredients:

| | Gms. |
|---|---|
| 2-acetamido-4-phenylthiazole | 100 |
| Lactose | 1000 |

A uniform mixture of the active ingredient and the lactose is prepared and filled into two-piece hard gelatin capsules.

The capsules are useful clinically in the inhibition of gastric secretion being administered orally four times daily to human patients with moderate gastric hypersecretion.

150 gms. of phenobarbital (15 mgs. per capsule) are added to the above formulation providing complementary sedative effects in the treatment of gastric hypersecretion.

*Example 3.—Capsule for oral administration*

10,000 capsules, each containing 50 mgs. of 2-acetamido-4-phenylthiazole, are prepared from the following types and amounts of ingredients:

| | |
|---|---|
| 2-acetamido-4-phenylthiazole gms | 500 |
| Corn oil | q.s. |

A uniform dispersion of the active ingredient in the corn oil is prepared and encapsulated into one-piece soft gelatin capsules. The capsules provide satisfactory inhibition of gastric secretion in humans when administered orally four times daily to patients with gastric hypersecretion.

2000 gms. of ectylurea (200 mgs. per capsule) are added to the above formulation providing complementary psychotherapeutic effects in the treatment of gastric hypersecretion.

*Example 4.—Aqueous suspension for oral administration*

1000 mls. of a suspension vehicle are prepared from the following types and amounts of ingredients:

| | | |
|---|---|---|
| Tragacanth | gms | 2 |
| Sucrose | gms | 500 |
| Preservative | gms | 2 |
| Purified water U.S.P., q.s. ad | mls | 1000 |

50 gms. of cocoa, q.s. flavor and 20 gms. of the finely powdered active ingredient 2-acetamido-4-phenylthiazole are added in order. The whole is mixed well and homogenized. Each teaspoonful (5 mls.) contains 100 mgs. of the active ingredient.

Gastric secretion in humans with hypersecretion is inhibited by a dose of one teaspoonful administered orally four times daily.

400 mgs. of chlorpheniramine maleate (2 mgs. per 5 mls.) are added to the above formulation providing complementary antihistaminic effects in the treatment of gastric hypersecretion.

*Example 5.—Elixir for oral administration*

1000 mls. of elixir containing in each teaspoonful (5 mls.) 10 mgs. of 2-acetamido-4-phenylthiazole is prepared from the following types and amounts of ingredients:

| | | |
|---|---|---|
| 2-acetamido-4-phenylthiazole | gms | 2 |
| Ethanol | mls | 300 |
| Sucrose | gms | 500 |
| Glycerine U.S.P. | mls | 150 |
| Preservative | gms | 2 |
| Purified water U.S.P., q.s. ad | mls | 1000 |

The active ingredient and the preservative are dissolved in the ethanol. The sucrose is dissolved in the water. The two solutions are well mixed. The glycerine is added to the mixture and the whole is made up to volume with q.s. water. A dose of one teaspoonful administered four times daily to humans provides satisfactory gastric secretion inhibition in moderate hypersecretory afflictions.

25 mgs. of chlorzoxazone (125 mgs. per 5 mls.) are added to the above formulation providing complementary skeletal muscle relaxant effects in the treatment of gastric hypersecretion.

It is to be understood that the invention is not to be limited to the exact details of operation or exact composition shown and described herein as obvious modifications and equivalents will be apparent to one skilled in the art, and the invention is therefore to be limited only by the scope of the appended claim.

What is claimed is:

The method of inhibiting gastric secretion in human beings which comprises the oral administration to said humans of an oral pharmaceutical preparation comprising in dosage unit form from about 5 to about 200 milligrams of 2-acetamido-4-phenylthiazole and an oral pharmaceutical carrier.

References Cited in the file of this patent

UNITED STATES PATENTS 2,656,358  Sperber et al. _____ Oct. 20, 1953

OTHER REFERENCES

Dodson et al.: J.A.C.S., vol. 67, pp. 2242–43, Dec. 1945.

Jenkins et al.: "Chemistry of Organic Med. Products," John Wiley and Sons, N.Y. (1957), pp. 211–218, 407, 412.

Woolley: "A Study of Anti Metabolites," John Wiley and Sons, N.Y. (1952), pp. 57–59, 80, 184–193; ff. 347 on p. 187.

Sheehan et al.: J.A.C.S., vol. 71, pp. 1436–1440 (1949).

Stern: J. Allergy, vol. 26, pp. 268–72 (1955).